US012625938B2

(12) United States Patent
Lee

(10) Patent No.: US 12,625,938 B2
(45) Date of Patent: May 12, 2026

(54) ELECTRONIC DEVICE FOR PERFORMING USER AUTHENTICATION BY USING USER BIOMETRIC INFORMATION, AND OPERATION METHOD THEREOF

(71) Applicant: GHOST PASS Inc., Gwangju (KR)

(72) Inventor: Seon Gwan Lee, Gwangju (KR)

(73) Assignee: GHOST PASS Inc., Gwangju (KR)

( * ) Notice: Subject to any disclaimer, the term of this patent is extended or adjusted under 35 U.S.C. 154(b) by 288 days.

(21) Appl. No.: 17/515,759

(22) Filed: Nov. 1, 2021

(65) Prior Publication Data

US 2022/0058256 A1 Feb. 24, 2022

Related U.S. Application Data

(63) Continuation of application No. PCT/KR2020/008945, filed on Jul. 8, 2020.

(30) Foreign Application Priority Data

Nov. 1, 2019 (KR) ......................... 10-2019-0138728

(51) Int. Cl.
*G06F 21/35* (2013.01)
*G06F 3/041* (2006.01)
*G06F 21/32* (2013.01)

(52) U.S. Cl.
CPC .............. *G06F 21/35* (2013.01); *G06F 3/041* (2013.01); *G06F 21/32* (2013.01)

(58) Field of Classification Search
CPC ........... G06F 21/32; G06F 21/35; G06F 3/041
See application file for complete search history.

(56) References Cited

U.S. PATENT DOCUMENTS

| | | |
|---|---|---|
| 2008/0019573 A1 | 1/2008 | Baltatu et al. |
| 2015/0066534 A1* | 3/2015 | Tanaka ................... G16H 10/60 705/2 |
| 2015/0237046 A1* | 8/2015 | Chang ..................... G06F 21/32 726/7 |
| 2015/0304321 A1 | 10/2015 | Wong et al. |

(Continued)

FOREIGN PATENT DOCUMENTS

| | | |
|---|---|---|
| JP | 2002278640 A | 9/2002 |
| KR | 1020150098002 A | 8/2015 |

(Continued)

OTHER PUBLICATIONS

International Search Report of PCT/KR2020/008945 dated Dec. 1, 2020.

(Continued)

*Primary Examiner* — Nicholas P Celani
(74) *Attorney, Agent, or Firm* — DINSMORE & SHOHL LLP

(57) ABSTRACT

The present invention relates to an electronic device for performing user authentication on a user by using user biometric information in response to a request made by a user authentication request device, wherein the user authentication request device transmits data obtained by sensing the body of a user adjacent thereto to the electronic device (a user authentication device) of the user to request user authentication, and receives authentication result data from the user authentication device.

19 Claims, 8 Drawing Sheets

(56)          References Cited

U.S. PATENT DOCUMENTS

| | | | |
|---|---|---|---|
| 2016/0366188 A1 * | 12/2016 | Smith | H04L 63/101 |
| 2017/0244702 A1 * | 8/2017 | Jwa | H04L 63/10 |
| 2017/0324736 A1 * | 11/2017 | Connell, II | G06F 21/32 |
| 2018/0270227 A1 * | 9/2018 | Shim | G06F 21/32 |
| 2022/0058256 A1 | 2/2022 | Lee | |

FOREIGN PATENT DOCUMENTS

| | | |
|---|---|---|
| KR | 1020170081500 A | 7/2017 |
| KR | 1020170098105 A | 8/2017 |

OTHER PUBLICATIONS

S.Kavin Hari Hara Sudhan, "Double Encryption Based Secure Biometric Authentication System". International Journal of Engineering Trends and Technology (IJETT)., vol. 3, issue 1, pp. 64-70 Jan.-Feb. 2012. ISSN:2231-5381. www.ijettjournal.org. published by seventh sense research group.
Extended European Search Report of EP 20883553.8 dated Oct. 10, 2023.
Non-Final Office Action of U.S. Appl. No. 18/504,298, mailed Feb. 21, 2025, 19 pages, USPTO.

* cited by examiner

START

RECEIVE INFORMATION ON USER OF
USER AUTHENTICATION DEVICE — 301

SENSE BODY OF ADJACENT USER — 302

SPECIFY USER AUTHENTICATION DEVICE — 303

TRANSMIT SENSING DATA TO
USER AUTHENTICATION DEVICE — 304

RECEIVE DATA ABOUT
WHETHER AUTHENTICATION IS EXECUTED — 305

EXECUTE FUNCTION ACCORDING TO
WHETHER AUTHENTICATION BEING EXECUTED — 306

END

ELECTRONIC DEVICE FOR PERFORMING USER AUTHENTICATION BY USING USER BIOMETRIC INFORMATION, AND OPERATION METHOD THEREOF

CROSS-REFERENCE TO RELATED APPLICATIONS

This application is a continuation of International Application No. PCT/KR2020/008945 filed on Jul. 8, 2020, which claims priority to Korean Patent Application No. 10-2019-0138728 filed on Nov. 1, 2019, the entire contents of which are herein incorporated by reference.

TECHNICAL FIELD

The present disclosure relates to an electronic device for executing user authentication by using user biometric information and an operation method thereof, and more specifically, relates to an electronic device for executing user authentication of a user by using user biometric information in response to a request from a user authentication request device.

BACKGROUND

Various electronic devices provide various functions using user biometric information. For example, in mobile electronic devices, there is a mobile electronic device which recognizes the user face or iris. Alternatively, there is a door security device which recognizes a user fingerprint to open the door. Various services provided by using the user biometric information offer convenience to the user. However, in a case where the user biometric information is hacked or disclosed, there is a security problem that can cause fatal damage to the user, so that there are limitations in providing various functions.

SUMMARY OF INVENTION

Technical Problem

According to embodiments, the user biometric information may be stored only in the electronic device designated by the user, and the user authentication may be directly executed by the user according to a request from another electronic device. If the user just brings the body of the user to another electronic device related to the service that the user wants to use, that is, the user authentication is completed on the electronic device designated by the user without any separate operation by the user, and thereby the user may be recognized by the other electronic device related to the service.

According to other embodiments, the user authentication may be completed according to a request of another electronic device that senses the body of the user in the electronic device and the server of the user in a form in which the user biometric information is encrypted.

Solution to Problem

According to one aspect, there is provided a user authentication device including a wireless communication circuit; one or more processors electrically coupled to the wireless communication circuit; and a memory electrically connected to the one or more processors. The memory may include first biometric information on a user and information on a user authentication request device, the one or more processors may confirm whether first data received from the user authentication request device by using the wireless communication circuit matches with the first biometric information, and the wireless communication circuit may transmit authentication result data for whether the first data matches with the first biometric information to the user authentication request device.

According to an embodiment, the first biometric information may include at least one of fingerprint information, DNA information, body skeleton information, hand shape information, retina information, iris information, face information, vein information, electrocardiogram information, handwriting information, gait information, signature information, blood vessel information, sweat gland structure information, voice information, and biomolecular information.

According to an embodiment, the user authentication device may further include an input/output device. The input/output device may receive a first ultrasonic signal, and the one or more processors may output a second ultrasonic signal by using the input/output device in response to the first ultrasonic signal being received.

According to the embodiment, the first ultrasonic signal may be included in the information of the user authentication request device and the second ultrasonic signal may include identification information of the user authentication device.

According to an embodiment, the user authentication device may include a camera module or a sensor module, the one or more processors may acquire the first biometric information based on data obtained by sensing the body of the user by using the camera module or the sensor module, and the memory may store the first biometric information in a security area.

According to an embodiment, the user authentication device may further include an input/output device. The one or more processors may install an application related to the user authentication request device by a selection of the user, the one or more processors may store the information on the user authentication request device by using the application in the memory, the one or more processors may use the input/output device to acquire data about one or more pieces of information requested from the user authentication request device by using the application, and the wireless communication circuit may transmit the acquired one or more pieces of information to the user authentication request device.

According to the embodiment, the information on the user authentication request device may include at least one of a type of a service related to the user authentication request device, specific contents of the service related to the user authentication request device, a position of the user authentication request device, a type of the user authentication request device, and sensor information included in the user authentication request device.

According to the embodiment, the information on the user may include at least one of an ID, a password, a name, a gender, a mobile phone number, an addresses, an email address, an identification number related to the service provided by the user authentication request device, a type of the service to be used, and specific contents of the service.

According to another aspect, there is provided a user authentication request device including an input/output device; a sensor module; a camera module; a wireless communication circuit; and one or more processors electrically connected to the input/output device, the sensor module, the camera module, and the wireless communication circuit. The one or more processors may acquire raw data obtained by sensing the body of the user by using the sensor module or the camera module, and acquire identification information on a user authentication device of a first user by using the input/output device, the wireless communication circuit may transmit the raw data to the user authentication device of the first user based on the identification information on the user authentication device of the first user, and the one or more processors may execute a function determined based on authentication data received from the user authentication device of the first user by using the wireless communication circuit.

According to an embodiment, the user authentication request device may further include a memory electrically connected to the one or more processors. The memory may include information on the user received from the user authentication device of the first user.

According to the above embodiment, the memory may not store the raw data.

According to an embodiment, the input/output device may output a first ultrasonic signal and receive a second ultrasonic signal in response to an output of the first ultrasonic signal, and the one or more processors may acquire an identification number of the user authentication device of the first user based on the second ultrasonic signal.

According to an embodiment, the input/output device may include a touch screen, the one or more processors may display information request for the user authentication device of the first user by using the touch screen and acquire a selection of the user in response to the displayed information, and the one or more processors may acquire an identification number for the user authentication device of the first user based on the acquired user selection data.

According to another aspect, there is provided a server including a wireless communication circuit; one or more processors electrically connected to the wireless communication circuit; and a memory electrically connected to the one or more processors. The wireless communications circuit may receive double-encrypted first data from a first electronic device, the one or more processors may store first result data to which a first decryption method that is predetermined for the first data is applied in the memory, the first result data may include identification information on the first electronic device, the wireless communication circuit may receive second data from a second electronic device, the one or more processors may retrieve second result data to which a second encryption method that is predetermined for the second data is applied in the memory, and the wireless communication circuit may transmit identification information on the first electronic device according to the retrieving result to the second electronic device.

According to an embodiment, the first result data may include encrypted user biometric information of the first electronic device, and may not include key data for decrypting the encrypted user biometric information of the first electronic device.

According to an embodiment, the one or more processors may transmit user authentication completion data to the second electronic device in response to the second result data being retrieved in the memory to the second electronic device.

According to an embodiment, the one or more processors may transmit the second data to the first electronic device in response to the second result being retrieved in the memory.

Advantageous Effects

According to the embodiments, the user can recognize the user authentication (identification) in another electronic device related to the service that the user wants to use without separate manipulation. Therefore, the service to be used can be immediately accessed thereby providing convenience to the user.

According to the embodiments, the user biometric information is stored only in the electronic device which is directly managed by the user, for example, the portable electronic device of the user. Therefore, it is possible to reduce the risk of exposure of personal information to other electronic devices.

According to the embodiments, a burden of the server which executes the traditional user authentication is reduced and the biometric information of many users is not stored in the server. Therefore, it is possible to eliminate a problem of personal information leakage accidents caused by server hacking.

BEST MODE

Figure 1:
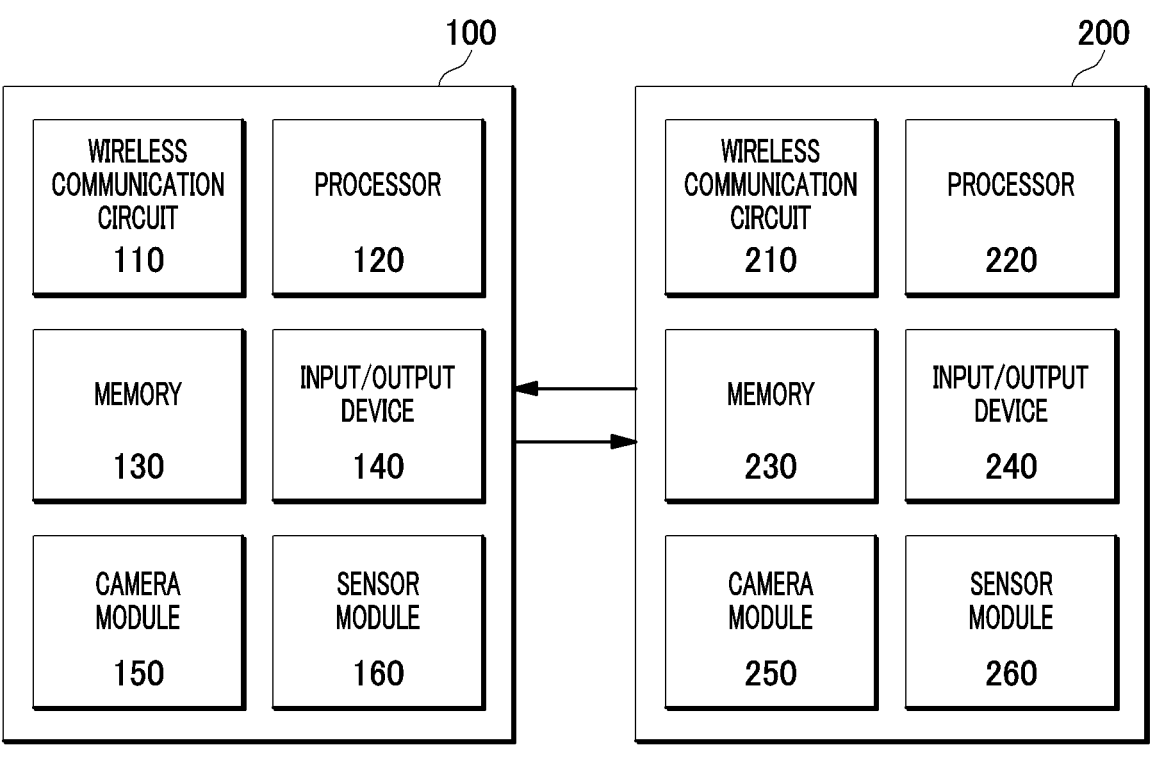
FIG. 1 is a block diagram of a user authentication device and a user authentication request device according to an embodiment.

Hereinafter, embodiments will be described in detail with reference to the accompanying drawings. However, the scope of rights is not limited or restricted by these embodiments. Like reference numerals in each drawing indicate like elements.

Although terms used in the description below have been selected to be general and universal in the related technical field, there may be other terms depending on developments and/or changes in technology, customs, preferences of technicians, or the like. Accordingly, the terms used in the description below are not to be understood as limiting the scope, and it is to be understood as exemplary terms for describing the embodiments.

In addition, in certain cases, there are terms arbitrarily selected by the applicant, and in this case, the meaning will be described in detail in the corresponding description. Therefore, the terms used in the description below should be understood based on the meaning of the terms and the contents throughout the specification, not simple names of the terms.

FIG. 1 is a block diagram of a user authentication device and a user authentication request device according to an embodiment. A user authentication device 100 confirms biometric information received from a user authentication request device 200 to execute user authentication. The user authentication device 100 may execute the user authentication by comparing biometric information stored in the user authentication device 100 with biometric information obtained by being sensed by the user authentication request device 200. For example, the user authentication device 100 may be a user portable electronic device and the user authentication request device 200 may be an electronic device installed in an affiliate store of a business that provides a service that the user wants to use. It is obvious that the service which the user wants to use may vary, and the electronic device related to the service may exist in various forms.

Referring to FIG. 1, the user authentication device 100 may include a wireless communication circuit 110, a processor 120, a memory 130, an input/output device 140, a camera module 150, and a sensor module 160.

The wireless communication circuit 110 may be set to communicate between the user authentication device 100 and an external device (for example, the user authentication request device 200 or a server (not illustrated)). Wireless communication may include, for example, cellular communication using at least one of LTE, LTE-A (LTE Advance), CDMA (code division multiple access), WCDMA (wideband CDMA), UMTS (universal mobile telecommunications system), WiBro (Wireless Broadband), GSM (Global System for Mobile Communications), and the like. According to an embodiment, the wireless communication may include, for example, at least one of WiFi (wireless fidelity), Bluetooth, Bluetooth low energy (BLE), ZigBee, NFC (near field communication), Magnetic Secure Transmission, a radio frequency (RF), or a body area network (BAN). According to an embodiment, the wireless communication may include GNSS. The GNSS may be, for example, GPS (Global Positioning System), Glonass (Global Navigation Satellite System), Beidou Navigation Satellite System, Galileo, or European global satellite-based navigation system.

The processor 120 may include, for example, one or more of a central processing unit, an application processor, and a communication processor (CP). The processor 120 may execute, for example, an operation or data processing related to control and/or communication of at least one of other components of the user authentication device 100.

The memory 130 may include volatile and/or nonvolatile memory. The memory 130 may store, for example, a command or data related to at least one of other components of the user authentication device 100. According to an embodiment, the memory 130 may store software and/or a program. The program may include, for example, a kernel, middleware, application programming interface (API), and/or an application program (or "application"). The memory 130 may include, for example, an internal memory or an external memory. The internal memory may include, for example, at least one of a volatile memory (for example: DRAM, SRAM, SDRAM, or the like), a non-volatile memory (for example: OTPROM (one time programmable ROM), PROM, EPROM, EEPROM, mask ROM, flash ROM, flash memory, hard drive, or solid-state drive (SSD). The external memory may include a flash drive, for example, CF (compact flash), SD (secure digital), Micro-SD, Mini-SD, xD (extreme digital), MMC (multi-media card), a memory stick and, or the like. The external memory may be functionally or physically connected to the user authentication device 100 via various interfaces.

The input/output device 140 may include, for example, a touch panel, a (digital) pen sensor, a key, an ultrasonic input device, a display, or an audio module. The touch panel may use, for example, at least one of a capacitive type, a pressure sensitive type, an infrared type, and an ultrasonic type. The (digital) pen sensor may be, for example, a part of the touch panel, or include a separate recognition sheet. The key may include, for example, a hardware button, an optical key, or a keypad. The ultrasonic input device may detect the ultrasonic waves generated from input means through a microphone to confirm data corresponding to the sensed ultrasonic waves. The display may include a panel, a hologram device, a projector, and/or a control circuit for controlling them. The panel may be implemented, for example, to be flexible, transparent, or wearable. In an embodiment, the panel may include a pressure sensor (or a force sensor) which is capable of measuring an intensity of a pressure on the touch of the user. The hologram device may illustrate a three-dimensional image in the air by using light interference. The projector may display an image by projecting light onto a screen. The screen may be located, for example, inside or outside the user authentication device 100. The audio module may convert, for example, sound and an electrical signal interactively. The audio module may process, for example, sound information which is input or output via a speaker, a receiver, an earphone, a microphone, or the like.

The camera module 150 is, for example, a device for taking still and moving images and according to an embodiment, may include one or more image sensors (for example: a front sensor or a rear sensor), a lens, an image signal processor (ISP), or a flash (example: LED or xenon lamp, or the like).

The sensor module 160 may measure, for example, a physical quantity or detect an operation state of the user authentication device 100 to convert measured or detected information to an electrical signal. The sensor module 160 may include, for example, a gesture sensor, a biosensor, an e-nose sensor, an electromyography (EMG) sensor, an electroencephalogram (EEG) sensor, an electrocardiogram (ECG) sensor, an IR (infrared) sensor, an iris sensor, and/or a fingerprint sensor. The sensor module 160 may further include a control circuit for controlling at least one or more sensors included therein. In some embodiments, the user authentication device 100 may further include a processor separately or as a part thereof, which is configured to control the sensor module 160 to control the sensor module 160 while the processor 120 is in a sleep state.

In various embodiments of the present disclosure, the user authentication device 100 may include the wireless communication circuit 110, one or more processors 120 electrically connected to the wireless communication circuit 110, and at least one memory 130 electrically connected to the processor 120. The memory 130 may include first biometric information on the user and information on the user authentication request device. For example, information on the user authentication request device 200 may include at least one of a type of a service related to the user authentication request device 200, specific contents of the service related to the user authentication request device 200, a position of the user authentication request device 200, a type of the user authentication request device 200, and sensor information included in the user authentication request device 200. The one or more processors 120 may confirm whether first data received from the user authentication request device 200 matches with first biometric information by using the wireless communication circuit 110. In this case, the information on the user authentication request device and the first biometric information may be stored in the memory before receiving the first data. In addition, the wireless communication circuit 110 may transmit authentication result data about whether the first data matches with the first biometric information, to the user authentication request device 200. In addition, the first data may be set to be deleted in response to being transmitted from the user authentication request device to the user authentication device.

In various embodiments of the present disclosure, the first biometric information may include at least one of fingerprint information, DNA information, body skeleton information, hand shape information, retina information, iris information, face information, vein information, electrocardiogram information, handwriting information, gait information, signature information, blood vessel information, gland structure information, voice information, and biomolecular information.

In various embodiments of the present disclosure, the input/output device 140 may be further included. The input/output device 140 may receive a first ultrasonic signal and output a second ultrasonic signal in response to the received first ultrasonic signal by the one or more processors 120. The first ultrasonic signal may include information on the user authentication request device 200, and the second ultrasonic signal may include identification information of the user authentication device 100.

In the various embodiments of the present disclosure, the camera module 150 or the sensor module 160 is included, the one or more processors 120 may acquire the first biometric information based on data obtained by sensing the body of the user by using the camera module 150 or the sensor module 160, and the memory 130 may store the first biometric information in a security area.

In various embodiments of the present disclosure, the one or more processors 120 may install an application related to the user authentication request device 200 by a selection of the user, and store the information on the user authentication request device 200 by using the application. The one or more processors 120 may acquire data about one or more information requested from the user authentication request device 200 by using the input/output device 140, and the wireless communication circuit 110 may transmit the acquired one or more information to the user authentication request device 200.

In various embodiments of the present disclosure, the information on the user authentication request device 200 may include at least one of the type of the service related to the user authentication request device 200, specific contents of the service related to the user authentication request device 200, the position of the user authentication request device 200, the type of the user authentication request device 200, and sensor information included in the user authentication request device 200.

In various embodiments of the present disclosure, the information on the user may include at least one of an ID, a password, a name, a gender, a mobile phone number, an address, an email address, an identification number related to the service provided by the user authentication request device, a type of the service to be used, and specific contents of the service.

Referring to FIG. 1, the user authentication request device 200 may include a wireless communication circuit 210, a processor 220, a memory 230, an input/output device 240, a sensor module 260, and a camera module 250.

The wireless communication circuit 210 may be set to execute the communication between the user authentication request device 200 and an external device (for example, the user authentication device 100 and a server (not illustrated)). The wireless communication circuit 210 may be implemented with the same as the wireless communication circuit 210 of the user authentication device 100.

The processor 220 may include one or more of a central processing unit, an application processor, and a communication processor (CP). The processor 120 may execute, for example, an operation or data processing related to control and/or communication of at least one of other components of the user authentication request device 200.

The memory 230 may include volatile and/or nonvolatile memories. The memory 230 may store, for example, a command or data related to at least one of other components of the user authentication request device 200. According to an embodiment, the memory 230 may store software and/or a program. The program may include, for example, a kernel, middleware, application programming interface (API), an application program (or "application"), and the like. The memory 230 may include, for example, an internal or external memory. For example, the internal memory may include at least one of the volatile memory (for example: DRAM, SRAM, SDRAM, or the like), the non-volatile memory (for example: OTPROM (one time programmable ROM), PROM, EPROM, EEPROM, mask ROM, flash ROM, flash memory, hard drive, and solid-state drive (SSD)). The external memory may include a flash drive, for example, CF (compact flash), SD (secure digital), Micro-SD, Mini-SD, xD (extreme digital), MMC (multi-media card), memory stick, and the like. The external memory may be connected to the user authentication device functionally or physically via various interfaces.

The input/output device 240 may include, for example, a touch panel, a (digital) pen sensor, a key, an ultrasonic input device, a display, or an audio module. The touch panel may use, for example, at least one of a capacitive type, a pressure sensitive type, an infrared type, and an ultrasonic type. The (digital) pen sensor may be, for example, a part of the touch panel, or include a separate recognition sheet. The key may include, for example, a hardware button, an optical key, or a keypad. The ultrasonic input device may detect the ultrasonic waves generated from input means via a microphone to confirm data corresponding to the sensed ultrasonic waves. The display may include a panel, a hologram device, a projector, and/or a control circuit for controlling them. The panel may be implemented, for example, to be flexible, transparent, or wearable. In an embodiment, the panel may include a pressure sensor (or a force sensor) which is capable of measuring an intensity of a pressure on the touch of the user. The hologram device may illustrate a three-dimensional image in the air by using light interference. The projector may display an image by projecting light onto a screen. The screen may be located, for example, inside or outside the user authentication request device 200. The audio module may convert, for example, sound and an electrical signal interactively. The audio module may process, for example, sound information which is input or output via a speaker, a receiver, an earphone, a microphone, or the like.

The camera module 250 is, for example, a device for taking still and moving images and according to an embodiment, may include one or more image sensors (for example: a front sensor or a rear sensor), a lens, an image signal processor (ISP), or a flash (example: LED or xenon lamp, or the like).

The sensor module 260 may measure, for example, a physical quantity or detect an operation state of the user authentication request device 200 to convert measured or detected information to an electrical signal. The sensor module 160 may include, for example, a gesture sensor, a biosensor, an e-nose sensor, an electromyography (EMG) sensor, an electroencephalogram (EEG) sensor, an electrocardiogram (ECG) sensor, an IR (infrared) sensor, an iris sensor, and/or a fingerprint sensor. The sensor module 260 may further include a control circuit for controlling at least one or more sensors included therein. In some embodiments, the user authentication request device 200 may include the processor 220 separately or as a part thereof, which is configured to control the sensor module 160 to control the sensor module 260 while the processor 220 is in a sleep state.

In various embodiments of the present disclosure, the user authentication request device 200 may include the input/output device 240, the sensor module 260, the camera module 250, the wireless communication circuit 210, and one or more processors 220 electrically connected to the input/output device 240, the sensor module 260, the camera module 250, the wireless communication circuit 210. The one or more processors 220 may acquire raw data obtained by sensing the body of a first user by using the sensor module 260 or the camera module 250, and acquire identification information on the user authentication device of the first user. The wireless communication circuit 210 may transmit the raw data to the user authentication device of the first user based on the identification information of the user authentication device of the first user (specifying the user authentication device of the first user), and the one or more processors 220 may execute a predetermined function based on the authentication data received from the user authentication device of the first user by using the wireless communication circuit 210. In addition, the one or more processors may permanently delete the raw data in response to the raw data being transmitted to the user authentication device of the first user.

In various embodiments of the present disclosure, the memory 230 electrically connected to the one or more processors 220 may be further included. The memory 230 may include information on the user received from the user authentication device of the first user.

In various embodiments of the present disclosure, the memory 230 may not store the raw data.

In various embodiments of the present disclosure, the input/output device 240 may output a first ultrasonic signal, receive a second ultrasonic signal in response to the output of the first ultrasonic signal, and the one or more processors 220 may acquire an identification number for the user authentication device of the first user based on the second ultrasonic signal.

In various embodiments of the present disclosure, the input/output device 240 may include a touch screen. The one or more processors 220 may display information request for the user identity authentication device of the first user by using the touch screen, acquire a selection of the user in response to the displayed information, and acquire an identification number for the user authentication device of the first user based on the acquired selection of the user data.

Figure 2:
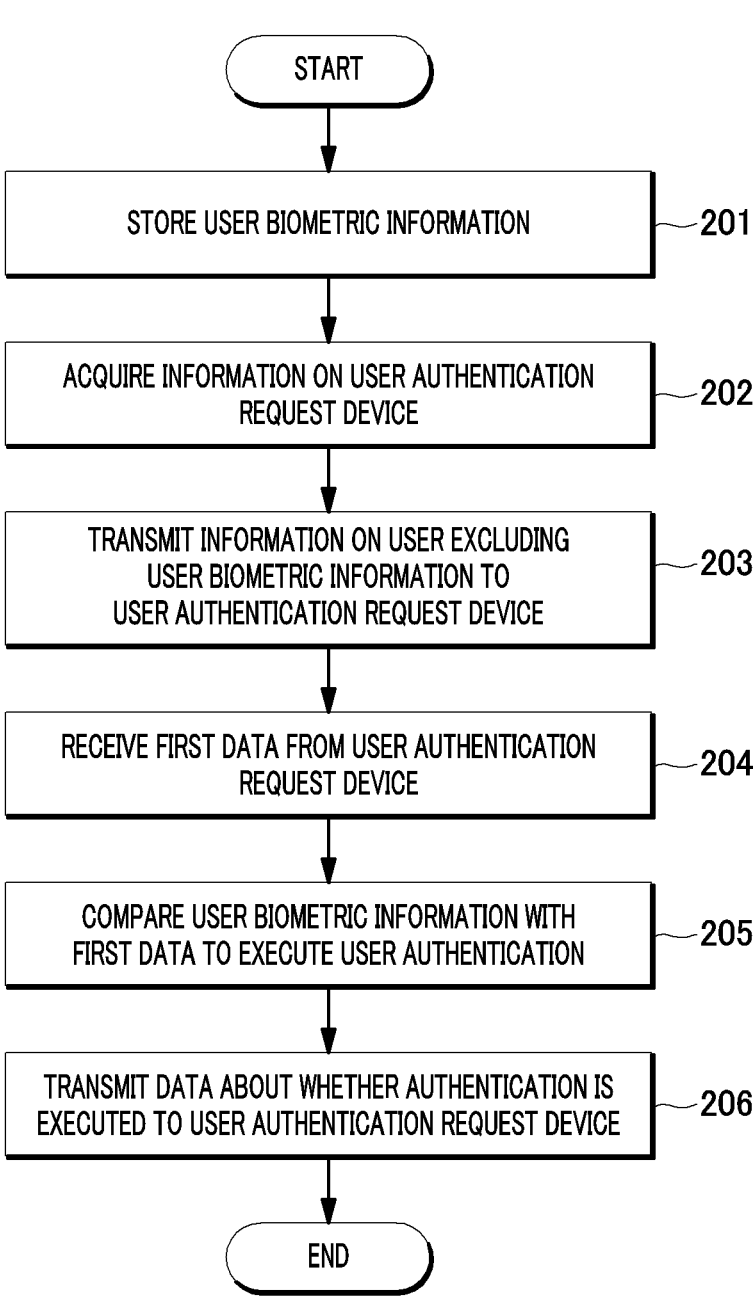
FIG. 2 is a flowchart of a method for executing user authentication by the user authentication device according to an embodiment.

FIG. 2 illustrates a flowchart of a method for executing the user authentication by the user authentication device according to an embodiment. The user authentication device (for example, the user authentication device 100 of FIG. 1) may confirm the biometric information received from the user authentication request device (for example, the user authentication request device 200 of FIG. 1) to execute the user authentication.

In step 201, the user authentication device 100 may store the user biometric information in the memory (for example, the memory 130 of FIG. 1) based on data obtained by sensing the body of the user. The biometric information may include at least one of fingerprint information, DNA information, body skeleton information, hand shape information, retina information, iris information, face information, vein information, electrocardiogram information, and handwriting information, gait information, signature information, blood vessel information, gland structure information, voice information, and biomolecular information. For example, the user authentication device 100 may store the face image of the user in the memory as the face information by sensing the face of the user using the camera module (for example, the camera module 150 of FIG. 1). As another example, the user authentication device 100 may store the iris image of the user in the memory as the iris information by sensing the eye of the user by using the sensor module (for example, the sensor module 160 of FIG. 1).

The user authentication device 100 according to an embodiment may store, in the memory 130, information on an identification card of the user together with the user biometric information. For example, the user authentication device 100 may store, in the memory 130, one or more of identification card information, passport information, and driver's license information.

In step 202, the user authentication device 100 may acquire information on the user authentication request device 200 by the selection of the user. For example, the user authentication device 100 may provide with an application related to the user authentication request device 200 according to the selection of the user for using the services provided by the user authentication request device 200. It is apparent that the information related to the user authentication request device 200 varies according to the type or the nature of the service provided by the user authentication request device 200. For example, the user authentication device 100 may acquire the type of service provided by the user authentication request device 200, the positions of the sensor of the user authentication request device 200, the camera of the user authentication request device 200, and the user authentication request device 200, the ultrasonic signal output from the user authentication request device 200, operator information providing the service, or information related to service usage. For example, when the user authentication request device 200 is a check-in electronic device for a hotel operator to provide accommodation services, the user authentication device 100 may install a hotel application provided by the hotel operator according to the selection of the user to install the application.

In step 203, the user authentication device 100 may transmit information on the user excluding the user biometric information, to the user authentication request device 200 by using the application. For example, the user authentication device 100 may receive information on the user according to an initial manual of the application, and the information on the input user may be transmitted to the user authentication request device 200. As the information requested by the user authentication request device 200, one or more items for identifying the user by an administrator (or operator) for managing the services provided by the user authentication request device 200 may be included. For example, the information on the user may include at least one of a username, a password, a name, a gender, a phone number, an addresses, an email address, an identification number (for example, a membership registration number) related to the service provided by the user authentication request device 200, a type of the service to be used, and specific contents of the service. However, the user biometric information is not included in the information on the user in any form. The user authentication request device 200 transmits the data obtained by sensing the body of the user by the user authentication request device 200, to the user authentication device 100 to request the user authentication. Therefore, it is possible to specify the sensed object is which user to use the service. For example, when the user authentication device 100 and the user authentication request device 200 share information on a user A, and the user authentication request device 200 transmits the data obtained by sensing the body of the user A to the user authentication device 100, the user authentication device 100 transmits a result of the determination whether the data obtained by being sensed by the user authentication request device 200 corresponds to the user A based on the biometric information of the user A. Therefore, the user authentication request device 200 may confirm that the user A has been sensed.

In step 204, the user authentication device 100 may receive first data from the user authentication request device 200 by using a wireless communication circuit. For example, the user authentication request device 200 may transmit the first data to the user authentication device 100 to execute the user authentication for the data obtained by sensing the body of the user by using the sensor module (for example, the sensor module 260 of FIG. 1), or the camera module (for example, the camera module 250 of FIG. 1). The user authentication device 100 may confirm the request for user authentication by receiving the first data from the user authentication request device 200. The user authentication device 100 and the user authentication request device 200 may preset the type of the first data. For example, the user authentication device 100 may set the first data by receiving the face image data of the user from the user authentication request device 200 and executing the user authentication.

The user authentication device 100 may confirm the information on the device which transmits the first data based on the stored information on the user authentication request device 200. In a case where the device which transmits the first data is different from the user authentication request device 200, the user authentication processing is not executed. For example, the user authentication device 100 may confirm the user authentication request device 200 by using the identification number of the device which transmits the first data. Alternatively, in a case where the user authentication device 100 receives the current position information of the device which transmits the first data and the current position is located within the position information of the user authentication request device 200, the user authentication process may be executed.

In step 205, the user authentication device 100 may compare the user biometric information stored in the memory 200 with the first data received from the user authentication request device 200, and confirm whether the authenticity is executed based on a comparison result. In a case where the first data matches with the user biometric information, the user authentication device 100 may confirm that the authentication is completed. In this case, the body of the user sensed by the user authentication request device 200 may be interpreted as corresponding to the body of the user of the user authentication device 100. Alternatively, in a case where the first data does not match with the user biometric information, the user authentication device 100 may confirm that the user authentication fails. In this case, the body of the user sensed by the user authentication request device 200 may be interpreted as not corresponding to the body of the user of the user authentication device 100.

In step 206, the user authentication device 100 may transmit the data about whether the authentication confirmed at step 205 is executed by using the wireless communication circuit 110. For example, user authentication device 100 may transmit, to the user authentication request device 200, the authentication data about whether the body of the user sensed by the user authentication request device 200 corresponds to the user of the user authentication device 100 based on the user biometric information. In a case where the user authentication is completed, the user authentication device 100 may transmit one or more predetermined items of information on the user, to the user authentication request device 200 at the same time. For example, the user authentication device 100 may transmit the ID of the user to the user authentication request device 200 together with the data to confirm that the user authentication is completed. In a case where the user authentication fails, the user authentication device 100 may transmit the data for confirming that the user authentication fails, to the user authentication request device 200.

The user authentication device 100 according to an embodiment may execute the user authentication while executing the identification card authentication of the user by using the user biometric information. In a case where the user authentication is completed, the user authentication device 100 may transmit the identification card information stored in the memory 130 to the user authentication request device 200 together with the authentication competition message. Alternatively, in a case where the user authentication is completed, the user authentication device 100 may transmit the message that the identification card authentication is completed together with the authentication completion massage.

Figure 3:
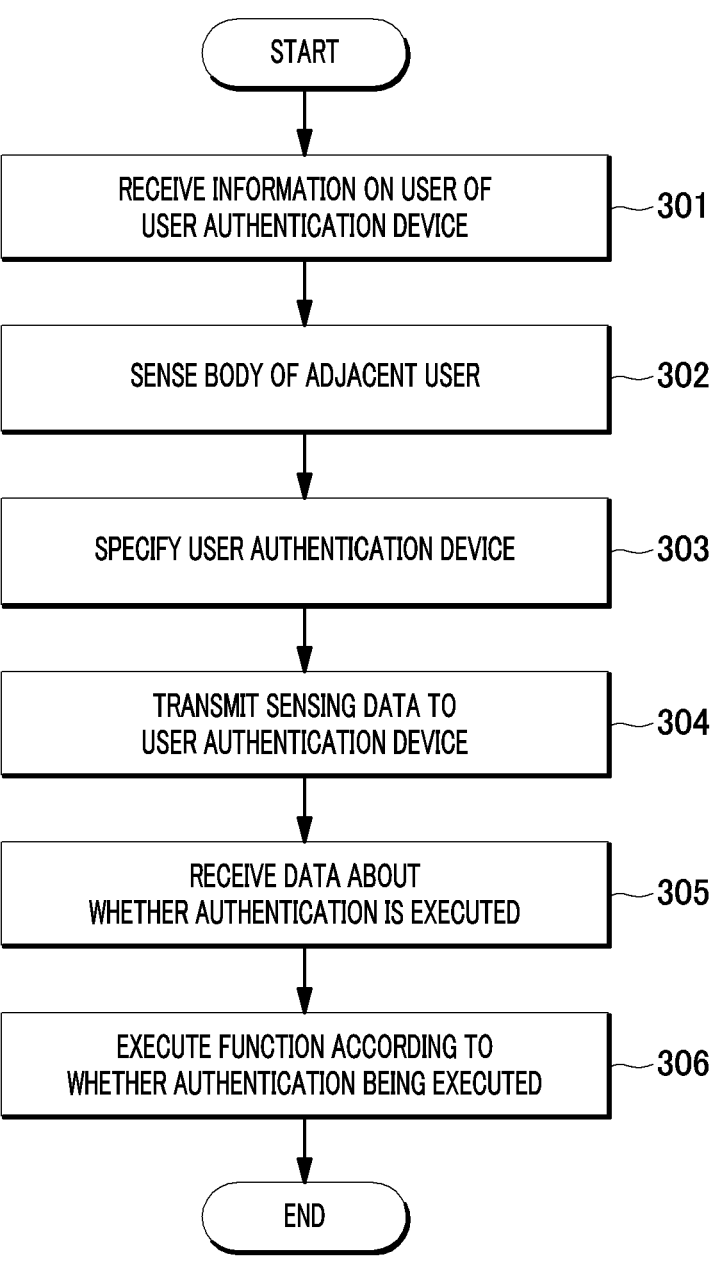
FIG. 3 is a flowchart of a method for requesting user authentication to the user authentication device by using data obtained by sensing the body of the user by the user authentication request device according to an embodiment.

FIG. 3 illustrates a flowchart of a method for requesting the user authentication to the user authentication device by using data obtained by sensing the body of the user by the user authentication request device according to an embodiment. The user authentication request device (for example, the user authentication request device 200 of FIG. 1) may transmit the data obtained by sensing the body of the adjacent user, to the user authentication device (for example, the user authentication device 100 of FIG. 1) and receive data about whether the user authentication is executed.

In step 301, the user authentication request device 200 may receive information on the user of the user authentication device 100 from the user authentication device 100. The information on the user is information requested by the user authentication request device 200 and may include one or more items to identify the user by the administrator (or operator) managing the services provided by the user authentication request device 200. For example, the information on the user may include at least one of the ID, the password, the name, the gender, the mobile phone number, the addresses, the email address, the identification number (for example, the membership registration number) related to the service provided by the user authentication request device 200, the type of the service to be used, and the specific contents of the service. The user authentication request device 200 may request the user authentication device 100 to transmit the information on the user by using an application.

In step 302, the user authentication request device 200 may acquire the data obtained by sensing the body of the user adjacent to the user authentication request device 200 by using the camera module or the sensor module.

In step 303, the user authentication request device 200 may specify the electronic device for transmitting the data being sensed with a first method which is a predetermined among methods for specifying one or more user authentication devices.

In various embodiments, the method for specifying the user authentication device may be variously implemented. In an embodiment, the user authentication request device 200 may specify the user authentication device by using the mobile phone number input at the time of sensing the body of the user. Alternatively, the user authentication request device 200 may specify the user authentication device by receiving a value previously designated by the user. For example, in a case where the user inputs a number excluding a part (for example, 010 value) of the mobile phone number, or inputs letters or numbers mixed with special characters, English, numbers, or the like, the user authentication device can be specified by retrieving a mobile phone number that matches therewith.

In another embodiment, the user authentication request device 200 may specify the user authentication device by using an ultrasonic signal received from the closest electronic device among one or more ultrasonic signals received while outputting a predetermined ultrasonic signal. In this regard, it will be described in detail with reference to FIG. 5.

In another embodiment, the user authentication request device 200 may transmit the data that is obtained by sensing the body of the user to the server and receive information on the user authentication device from the server.

The user authentication request device 200 may regard a specific electronic device as the user authentication device 100.

In step 304, the user authentication request device 200 may transmit the data obtained by sensing the body of the user to the user authentication device 100 by using the wireless communication circuit. The sensing data may be the raw data transmitted from the camera module or the sensor module, is only immediately transmitted to the user authentication device 100 via the wireless communication circuit (for example, the wireless communication circuit 210 of FIG. 2), and is not stored in the memory (for example, the memory 230 of FIG. 2) of the user authentication request device 200.

In step 305, the user authentication request device 200 may receive data about whether the user authentication is executed from the user authentication device 100. When receiving the data indicating that the user authentication is completed, the user authentication request device 200 may execute a first function determined according to the authentication success. For example, in a case where it is determined to execute a function of opening the door upon the authentication success, the user authentication request device 200 may open the door. When receiving data indicating that the user authentication has failed, the user authentication request device 200 may execute a second function determined according to the authentication failure. For example, in a case where a failure guidance message or alert is determined to be output when the authentication fails, the user authentication request device 200 may output text data of "authentication has failed", and output a voice massage of "authentication has failed, and please try again".

Figure 4:
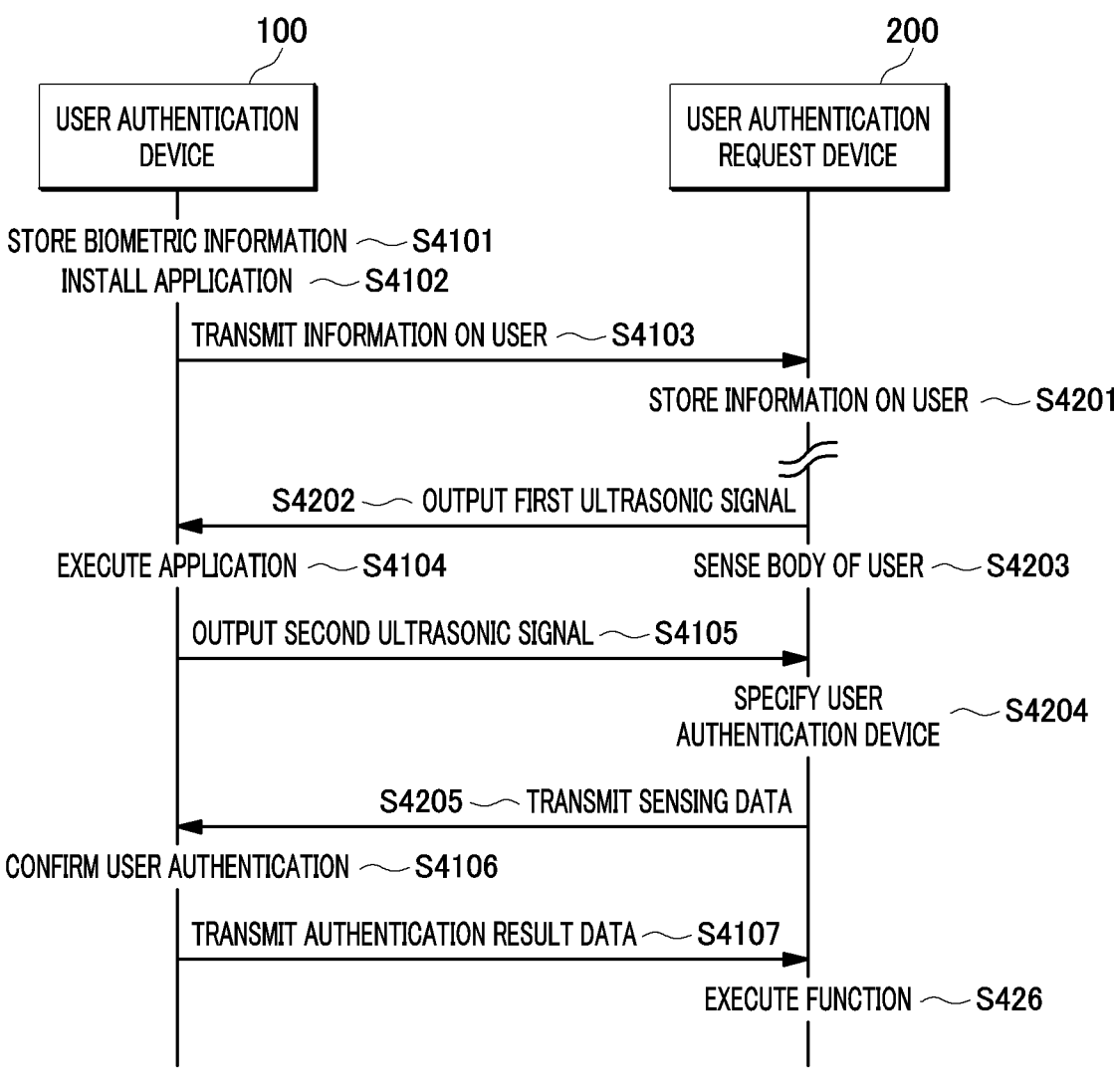
FIG. 4 is a sequence diagram illustrating user authentication processing according to a user authentication request between the user authentication device and the user authentication request device according to an embodiment.

FIG. 4 is a sequence diagram illustrating user authentication processing according to a user authentication request between the user authentication device and the user authentication request device according to an embodiment. The user authentication device (for example, the user authentication device 100 of FIG. 1) may receive the first data from the user authentication request device (for example, the user authentication request device 200 of FIG. 1) and compare the first data with the user biometric information, thereby confirming whether the authentication is executed and transmitting authentication confirmation data to the user authentication request device 200. Each step of FIG. 4 is as follows.

In S401, the user authentication device 100 may store the user biometric information in the memory (for example, the memory 130 of FIG. 1) based on the data obtained by sensing the body of the user.

In S402, the user authentication device 100 may install an application related to the user authentication request device 200 according to the user selection for using the service provided by the user authentication request device 200. The step corresponds to step 202 of FIG. 2.

In S403, the user authentication device 100 may transmit information on the user excluding the user biometric information to the user authentication request device 200 by using the application. The step also corresponds to step 203 of FIG. 2 and step 301 of FIG. 3.

In S404, the user authentication request device 200 may store the received information on the user in the memory.

In S405, the user authentication request device 200 may output a first ultrasonic signal. The user authentication request device 200 may periodically output the first ultrasonic signal that can reach a nearby electronic device in order to provide a service. The first ultrasonic signal may be transmitted in advance to an electronic device that intends to use the service provided by the user authentication request device 200. For example, the first ultrasonic signal may include identification information of the user authentication request device 200.

In S406, the user authentication device 100 may receive the first ultrasonic signal and execute the application in response to the first ultrasonic signal being received. The user authentication device 100 may identify the user authentication request device 200 based on the first ultrasonic signal and execute the application related to the user authentication request device 200.

In S407, the user authentication request device 200 may sense the body of the adjacent user by using the camera module or the sensor module. Although the step is illustrated between step S405 and step S408 in the drawing, it may be executed at any time before step S410. For example, it may be executed before S405 or after S409. The step corresponds to step 302 of FIG. 3.

In S408, the user authentication device 100 may output the second ultrasonic signal by being triggered to the operation of receiving the first ultrasonic signal. The user authentication device 100 may output the second ultrasonic signal to transmit the information on the user authentication device 100 to the user authentication request device 200. For example, the second ultrasonic signal may include the identification information on the user authentication device 100. A detailed description of the step will be described in FIG. 5.

In S409, the user authentication request device 200 may specify the user authentication device 100 based on the second ultrasonic signal. The step corresponds to step 303 of FIG. 3.

In S410, the user authentication request device 200 may transmit the sensing data obtained by sensing the body of the user to the user authentication device 100. The user authentication request device 200 may request the user authentication device 100 to execute the user authentication about the sensing data. The step corresponds to step 204 of FIG. 2 and step 304 of FIG. 3.

In S411, the user authentication device 100 may compare the received sensing data with the user biometric information registered in the user authentication device to confirm whether the user authentication is executed. The step corresponds to step 205 of FIG. 2.

In S412, the user authentication device 100 may transmit the authentication result data according to the user authentication to the user authentication request device 200. For example, the user authentication device 100 may transmit the authentication completion data or the authentication failure data. The steps corresponds to step 206 of FIG. 2 and step 305 of FIG. 3.

In S413, the user authentication request device 200 may execute a designated function according to the received authentication result data. For example, in a case of receiving the authentication completion data, the user authentication request device 200 may execute a function of opening the door. Alternatively, in a case of receiving authentication failure data, the user authentication request device 200 may output the authentication failure message. The step corresponds to step 306 of FIG. 3.

Figure 5:
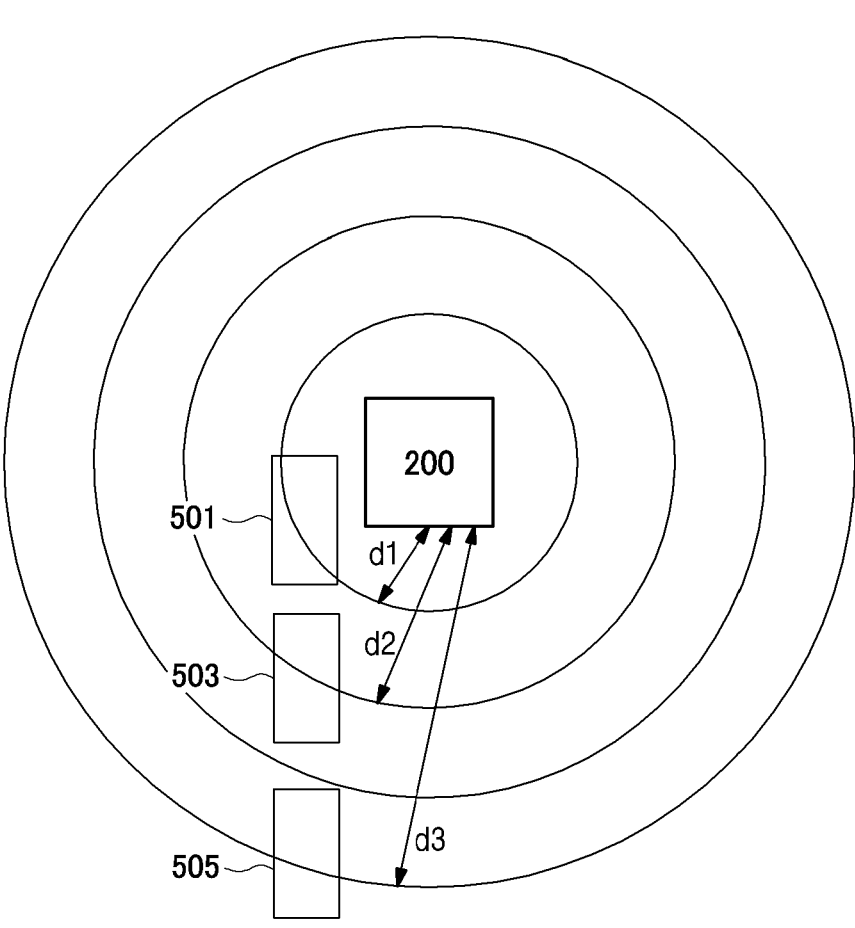
FIG. 5 is an example of a method for specifying the user authentication device by using an ultrasonic signal by the user authentication request device according to an embodiment.

FIG. 5 is an example of a method for specifying the user authentication device by using the ultrasonic signal by the user authentication request device 200 according to an embodiment. The user authentication request device (for example, the user authentication request device 200 of FIG. 1) may output the ultrasonic waves determined in advance so as to reach the adjacent electronic device, and identify the adjacent electronic device according to the received ultrasonic waves in response thereto.

Referring to FIG. 5, the user authentication request device 200 may output the first ultrasonic signal that can reach nearby electronic devices 501, 503, and 505 according to a predetermined period. The first ultrasonic signal may include the identification information of the user authentication request device 200, and the first ultrasonic signal may be transmitted in advance to another electronic device that intends to use the user authentication request device 200. With a number of methods, the other electronic device that intends to use the user authentication request device 200 may execute an application related to the user authentication request device 200 in response to the first ultrasonic signal being received. For example, the first electronic device 501, the second electronic device 503, and the third electronic device 505 may receive the first ultrasonic signal, and identify the user authentication request device 200. The first electronic device 501 may output an A ultrasonic signal in response to the first ultrasonic signal being received. The second electronic device 503 may output a B ultrasonic signal in response to the first ultrasonic signal being received. The third electronic device 505 may output a C ultrasonic signal in response to the first ultrasonic signal being received. The user authentication request device 200 may receive the A ultrasonic signal, the B ultrasonic signal, and the C ultrasonic signal. Referring to FIG. 5, among a distance d1 to the first electronic device 501, a distance d2 to the second electronic device 503, and a distance d3 to the third electronic device 505 from the user authentication request device 200, the closest distance is d1 and the farthest distance is d3. Thus, the user authentication request device 200 may select the A ultrasonic signal, which is output from the closest electronic device, among the A ultrasonic signal, the B ultrasonic signal, and the C ultrasonic signal. The user authentication request device 200 may specify the first electronic device 501 according to the A ultrasonic signal related to sensing the body of the adjacent user, as the user authentication device (for example, the user authentication device 100 of FIG. 1). For example, the user authentication request device 200 may retrieve information on the electronic device corresponding to the A ultrasonic signal in the memory, or confirm the identification information of the first electronic device 501 included in the A ultrasonic signal.

Figure 6:
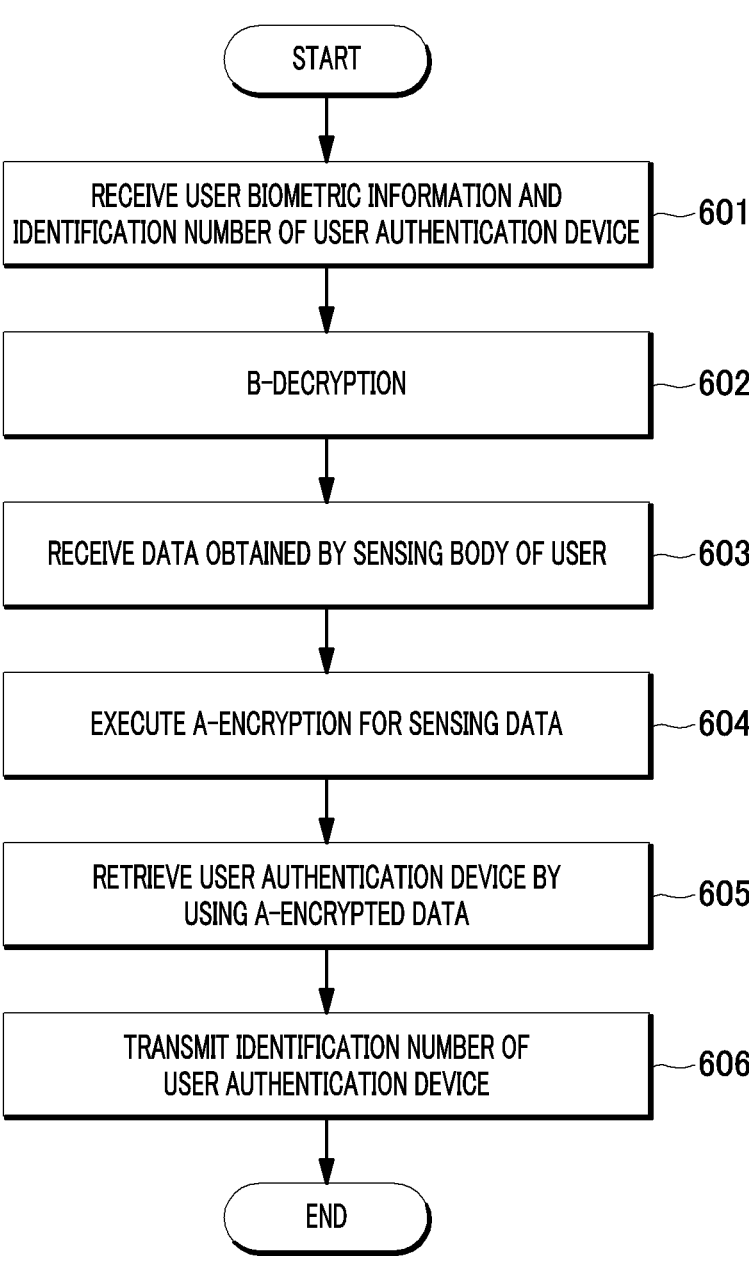
FIG. 6 is an example of a method for specifying the user authentication device via a server by the user authentication request device according to an embodiment.

FIG. 6 is an example of a method for specifying the user authentication device via the server by the user authentication request device according to an embodiment. The user authentication request device (for example, the user authentication request device 200 of FIG. 1) senses the body of the adjacent user and, needs to identify the electronic device of the user to request the user authentication to the electronic device of the user by using sensing data. The user authentication request device 200 may identify the electronic device of the user as the user authentication device (for example, the user authentication device 100 if FIG. 1) via the server. Referring to FIG. 6, the server may store the encrypted user biometric information received from the user authentication device 100, and the identification information of the user authentication device, and transmit the identification information of the user authentication device to the user authentication request device 200 according to the request of the user authentication request device 200.

In step 601, the server may receive the double-encrypted user biometric information and the identification number of the user authentication device 100 from the user authentication device 100. The server receives data in which the user biometric information and the identification number of the user authentication device 100 are combined, and cannot access the user biometric information, but can access the identification number of the user authentication device 100. For example, the server cannot decrypt the user biometric information, but can decrypt the identification number of the user authentication device 100. The double encryption will be described in detail with reference to FIG. 7.

In step 602, the server may acquire the user biometric information encrypted by B-decryption and the confirmable identification number of the user authentication device 100. The server may store data in a primarily decrypted state.

In step 603, the server may receive the data obtained by sensing the body of the user from the user authentication request device 200.

In step 604, the server may execute A-encryption for the sensing data received from the user authentication request device 200. The server cannot execute A decryption, but can retrieve data in an encrypted state.

In step 605, the server may retrieve the user authentication device 100 by using the A-encrypted sensing data. The server may acquire the identification number for the user authentication device 100 according to a retrieved result. For example, the identification number of the user authentication device 100 may be the mobile phone number of the user authentication device.

In step 606, the server may transmit the identification number of the user authentication device 100 to the user authentication request device 200.

Figure 7:
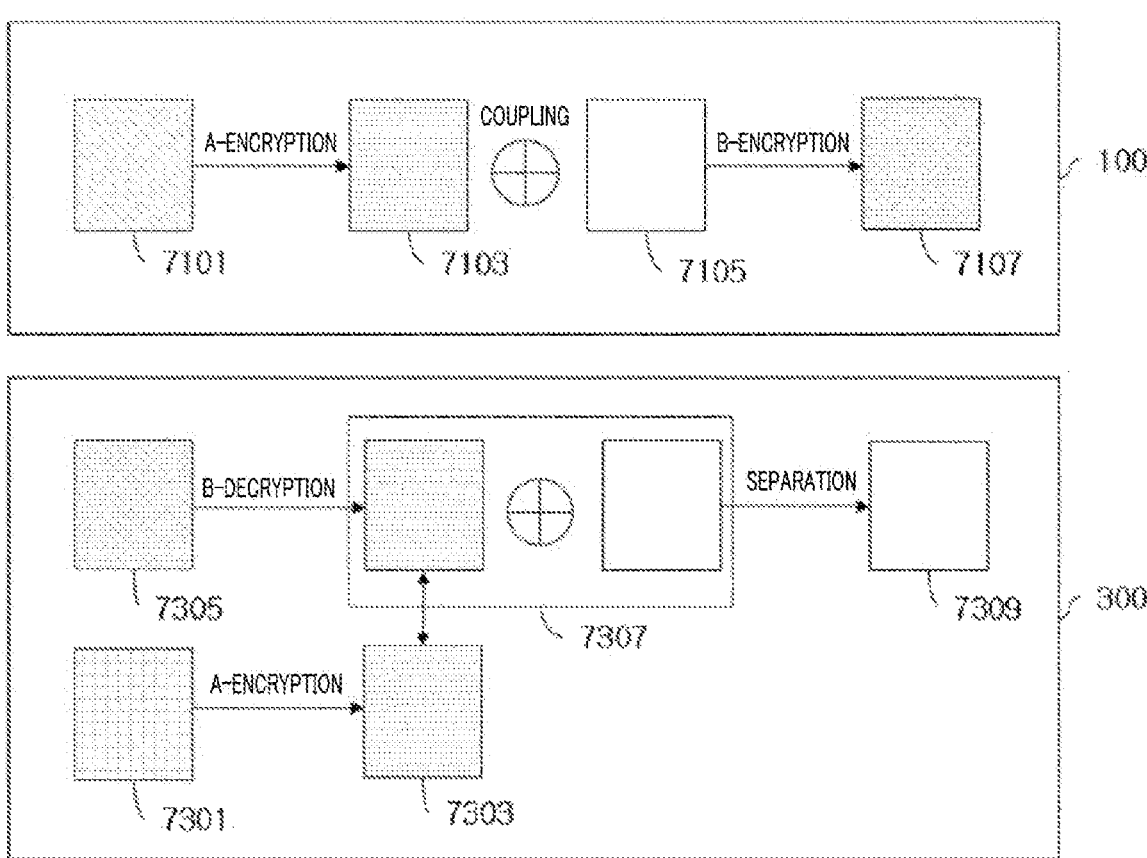
FIG. 7 is an example of encrypting data in the user authentication device and the server according to an embodiment.

FIG. 7 is an example of encrypting data in the user authentication device 100 and the server 300 according to an embodiment. The user authentication device 100 (for example, the user authentication device 100 of FIG. 1) and the server 300 may define the data in advance to be encrypted and decrypted according to the following different four conditions.

(1) The user authentication device 100 can execute the A-encryption in accordance with the A-algorithm and the A-decryption using aa key.

(2) The user authentication device 100 can execute the B-encryption in accordance with the B-algorithm and the B-decryption using bb key.

(3) The server 300 can execute the B-encryption in accordance with the B-algorithm and the B-decryption using bb key.

(4) The server 300 can execute the A-encryption in accordance with the A-algorithm but cannot execute the A-decryption because without having aa key.

Referring to FIG. 7, the user authentication device 100 may execute the A-encryption of the data 7101 obtained by sensing the body of the user. The A-encrypted biometric information 7103 of the user and the identification information 7105 of the user authentication device 100 may be coupled to each other, and combined one data 7103+7105 may be B-encrypted.

The server 300 may receive double-encrypted data 7107 and 7305 from the user authentication device 100. The server may acquire, as one piece of data 7307, the encrypted biometric information and the identification information of the user authentication device 100 which is capable of being confirmed by B-decrypting the double-encrypted data 7305.

The server 300 may receive data 7301 obtained by sensing the body of the user from the user authentication request device (for example, the user authentication request device 200 of FIG. 1). The server 300 may A-encrypt the received sensing data 7301. The server 300 may retrieve data 7307 including the user biometric information and the identification information of the user authentication device 100 by using the A-encrypted sensing data 7303. The server 300 may separate the identification information 7309 of the user authentication device 100 from the retrieved data 7307.

The server 300 stores the user biometric information, but it cannot decrypt itself while storing it in the memory in the encrypted form. Therefore, the security problem can be solved.

Figure 8:
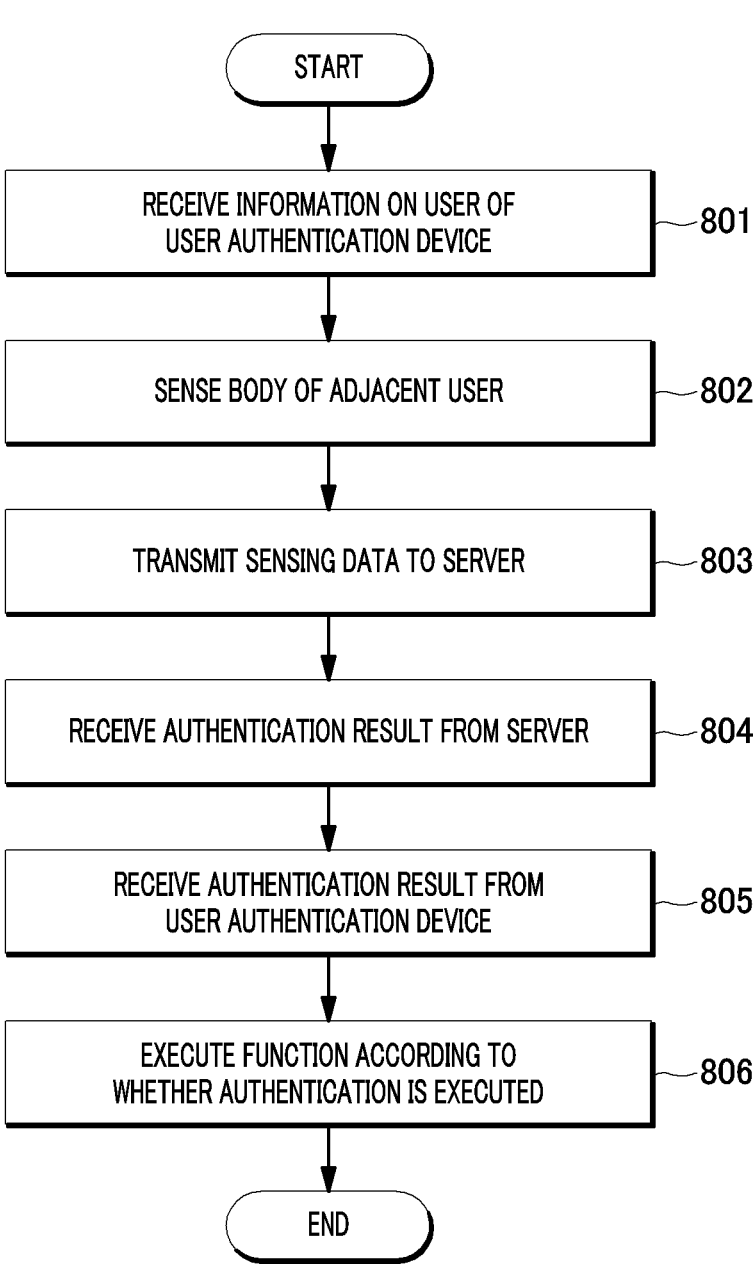
FIG. 8 is an example of a method for executing double user authentication using user biometric information in the user authentication device and the server according to an embodiment.

FIG. 8 is an example of a method for executing double user authentication by using the user biometric information in the user authentication device and the server according to an embodiment. The user authentication request device (for example, the user authentication request device 200 of FIG. 1) may transmit the data obtained by sensing the body of the adjacent user, to the server (for example, the server 300 of FIG. 7) and allow the server 300 and the user authentication device (for example, the user authentication device 100 of FIG. 1) to execute the user authentication in double.

In step 801, the user authentication request device 200 may 100. The information on the user may include user data for one or more items requested by the user authentication request device 200 excluding the user biometric information. For example, the user information may include at least one of the ID, the password, the name, the gender, the mobile phone number, the addresses, the email address, the identification number (for example, membership registration number) related to the service provided by the user authentication request device 200, the type of the service to be used, and the specific content of the service. The user authentication request device 200 may request the user authentication device 100 to transmit the information on the user by using an application. The step corresponds to step 301 of FIG. 3.

In step 802, the user authentication request device 200 may sense the body of the adjacent user by using the camera module or the sensor module. For example, the user authentication request device 200 may acquire the face image of the user by using the camera module.

In step 803, the user authentication request device 200 may transmit the sensing data to the server (for example, the server 300 of FIG. 7). The sensing data corresponds to the raw data and the raw data is not stored in the user authentication request device 200.

In step 804, the user authentication request device 200 may receive data about the authentication result from the server 300.

The server 300 may execute the user authentication on the sensing data received from the user authentication request device 200. The server 300 may store the encrypted user biometric information and in a case where the user biometric information matching with the encrypted state is retrieved, it is possible to confirm that the user of the user authentication device 100 is the user of the sensing data. According to the retrieved results, the server 300 may transmit the authentication completion or the authentication failure result data to the user authentication request device 200. The method for retrieving for the user authentication device 100 is the same as being described in detail with reference to FIGS. 6 and 7.

The server 300 may transmit the sensing data received from the user authentication request device 200 to the retrieved user authentication device 100 for double authentication. In this case, the sensing data corresponds to the encrypted data. In consideration of security and storage space, the server 300 may delete, without storing, the sensing data of the raw data state received from the user authentication request device 200.

In step 805, the user authentication request device 200 may receive the user authentication result data from the user authentication device 100. The user authentication device 100 may receive the encrypted sensing data according to step 804 from the server 300. The user authentication device 100 can decrypt the A encrypted data, thereby executing the A-decryption of the sensing data. The user authentication may be executed by comparing the decrypted sensing data with the user biometric information stored in the memory (for example, the memory 130 of FIG. 1) of the user authentication device 100. The user authentication device 100 may transmit the user authentication result data to the user authentication request device 200 (or via the server 300). The execution of the primary user authentication in the server 300 is the execution of the user authentication with the encrypted data, and the execution of the secondary user authentication in the user authentication device 100 is different from the execution of the user authentication with the sensing data.

In step 806, the user authentication request device 200 may execute a function determined according to the authentication result data. The step corresponds to step 306 of FIG. 3.

In various embodiments of the present disclosure, the server 300 may include the wireless communication circuit, one or more processors electrically connected to the wireless communication circuit, and the memory electrically connected to the one or more processors. The wireless communication circuit may receive the double-encrypted first data from the user authentication device 100, the one or more processors may store the first result data to which the first decryption method that is predetermined for the first data is applied, and the first result data may include the identification information on the user authentication device 100. The wireless communication circuit may receive the second data from the second electronic device (for example, the user authentication request device 200 of FIG. 1), the one or more processors may retrieve the second result data to which the second encryption method that is predetermined for the second data is applied, and the wireless communication circuit may transmit the identification information on the first electronic device 100 according to the retrieving result to the second electronic device 200.

In various embodiments of the present disclosure, the first result data may include the encrypted user biometric information of the first electronic device 100 and the server 300 may not include key data for decrypting the user biometric information.

In various embodiments of the present disclosure, server 300 may transmit the user authentication completion data to the second electronic device 200 in response to retrieving the second result data by the one or more processors in the memory.

In various embodiments of the present disclosure, the server 300 may transmit the second data to the first electronic device 100 in response to the second result being retrieved by the one or more processors in the memory.

The embodiments described above may be implemented as a hardware component, a software component, and/or a combination of the hardware component and the software component. For example, the devices, methods, and components described in the embodiments may be implemented by using a processor, a controller, an ALU (arithmetic logic unit), a digital signal processor, a microcomputer, a FPGA (field programmable gate array), a PLU (programmable logic unit), a microprocessor, at least one general-purpose computer or special purpose computer such as any other device capable of running and responding instructions. The processing device may execute an operating system (OS) and at least one software application running on the operating system. In addition, the processing device may access, store, manipulate, process, and generate data in response to the execution of the software. For convenience of understanding, although one processing device is sometimes described as being used, a person of ordinary skill in the art will recognize that the processing device may include a plurality of processing elements and/or a plurality of types of processing elements. For example, the processing device may include a plurality of processors, or one processor and one controller. In addition, another processing configuration such as a parallel processor is also possible.

The software may include a computer program, a code, an instruction, or at least one combination thereof, and configure the processing device to operate as desired, or command the processing device independently or collectively. In order to be interpreted by the processor or provide the instruction or data to the processing device, the software and/or data may be embodied permanently or temporarily in any type of machine, a component, a physical device, virtual equipment, computer storage media or device, or a wave signal to be transmitted. The software may be distributed over networked computer systems, and stored or executed in a distributed manner. The software and data may be stored in at least one computer-readable recording medium.

The method according to an embodiment may be implemented in a form of program instructions that can be executed through various computer means and recorded in a computer-readable medium. The computer-readable medium may include program instructions, data files, data structures, or the like alone or in combination. The program instructions recorded on the medium may be specially designed and configured for an embodiment, or may be known and available to those skilled in the art of computer software. Examples of computer-readable media include hardware devices specially configured to store and execute program instructions such as a hard disk, a floppy disk, magnetic media such as a magnetic tape, a CD-ROM, optical media such as a DVD, magneto-optical media such as a floptical disk, a ROM, a RAM, a flash memory, and the like. Examples of the program instructions include not only machine language codes such as those generated by a compiler, but also high-level language codes that can be executed by a computer using an interpreter or the like. The hardware devices described above may be configured to operate as at least one software module to execute the operations of the embodiments, and vice versa.

Although the above embodiments have been described by specific examples and drawings, those skilled in the art can execute various modifications, additions and substitutions from the above description. For example, appropriate results may be achieved even if the described techniques is executed in a way different from the described order of the method and/or the described components of the system, the structure, the device, the circuit, and the like are coupled or combined with other forms different from the described method, replaced, or substituted by equivalents. Therefore, other implementations, other embodiments, and equivalents to the claims also fall within the scope of the following claims.

INDUSTRIAL APPLICABILITY

The user can recognize the user authentication (identification) in another electronic device related to the service through the act of bringing the body of the user to another electronic device related to the service that the user wants to use without separate manipulation. Therefore, the service to be used can be immediately accessed thereby providing convenience to the user. It is possible to reduce the risk of exposure of personal information to other electronic devices, and eliminate a problem of personal information leakage accidents caused by server hacking. Thus, it can be useful in various fields that require the user authentication.

What is claimed is:

1. A system comprising:
a server; and
a user authentication device comprising:
a wireless communication circuit;
one or more processors electrically coupled to the wireless communication circuit; and
a memory electrically connected to the one or more processors,
wherein the memory includes first biometric information on a user,
the one or more processors are configured to:
acquire information on a user authentication request device based on an input from the user,
transmit information on the user separate from the first biometric information to the user authentication request device through the server,
receive first data transmitted by the user authentication request device through the server in response to transmitting the information on the user, the first data being data about a body of the user sensed by a sensor module or a camera module of the user authentication request device, confirm whether the first data matches with the first biometric information, and instruct the wireless communication circuit to transmit authentication result data for whether the first data matches with the first biometric information to the user authentication request device through the server, wherein the server acquires identification information of the user authentication device as a result of retrieving using the first data and transmits the identification information to the user authentication request device, wherein the user authentication device is specified as a device that stores the first biometric information matching the first data based on the identification information on the user authentication device acquired through the server, and wherein the first data is set to be deleted from the user authentication request device in response to being transmitted from the user authentication request device to the specified user authentication device.

2. The system of claim 1, wherein the first biometric information includes at least one of fingerprint information, DNA information, body skeleton information, hand shape information, retina information, iris information, face information, vein information, electrocardiogram information, handwriting information, gait information, signature information, blood vessel information, sweat gland structure information, voice information, and biomolecular information.

3. The system of claim 1, further comprising:

an input/output device, wherein the input/output device receives a first ultrasonic signal, and the one or more processors outputs a second ultrasonic signal by using the input/output device in response to the first ultrasonic signal being received.

4. The system of claim 3, wherein the first ultrasonic signal is included in the information of the user authentication request device and the second ultrasonic signal includes identification information of the user authentication device.

5. The system of claim 1, wherein the user authentication device includes a camera module or a sensor module, the one or more processors acquires the first biometric information based on data obtained by sensing a body of the user by using the camera module or the sensor module, and the memory stores the first biometric information in a security area.

6. The system of claim 1, further comprising:

an input/output device, wherein the one or more processors installs an application related to the user authentication request device by a selection of the user, the one or more processors stores the information on the user authentication request device by using the application in the memory, the one or more processors uses the input/output device to acquire data about one or more pieces of information requested from the user authentication request device by using the application, the wireless communication circuit transmits the acquired one or more pieces of information to the user authentication request device, and the one or more pieces of information include information on the user.

7. The system of claim 6, wherein the information on the user authentication request device includes at least one of a type of a service related to the user authentication request device, specific contents of the service related to the user authentication request device, a position of the user authentication request device, a type of the user authentication request device, and sensor information included in the user authentication request device.

8. The system of claim 6, wherein the information on the user includes at least one of an ID, a password, a name, a gender, a mobile phone number, an addresses, an email address, an identification number related to a service provided by the user authentication request device, a type of the service to be used, and specific contents of the service.

9. A system comprising:

a server; and a user authentication request device comprising:

an input/output device;

a sensor module;

a camera module;

a wireless communication circuit; and one or more processors electrically connected to the input/output device, the sensor module, the camera module, and the wireless communication circuit, wherein the one or more processors are configured to:

acquire raw data obtained by sensing a body of a user by using the sensor module or the camera module, acquire first identification information on a user authentication device of a first user by using the input/output device, transmit the raw data to the server and receive second identification information associated with the raw data from the server, specify the user authentication device of the first user storing biometric information matching the raw data based on the second identification information, instruct the wireless communication circuit to transmit the raw data through the server to the specified user authentication device of the first user, permanently delete the raw data in response to the raw date being transmitted to the user authentication device of the first user, and execute a function determined based on authentication data received from the user authentication device of the first user by using the wireless communication circuit, and wherein the server acquires the second identification information of the user authentication device as a result of retrieving using the raw data and transmits the second identification information to the user authentication request device.

10. The system of claim 9, further comprising:

a memory electrically connected to the one or more processors, wherein the memory includes information on the user received from the user authentication device of the first user.

11. The system of claim 10, wherein the memory does not store the raw data.

12. The system of claim 9, wherein the input/output device outputs a first ultrasonic signal and receives a second ultrasonic signal in response to an output of the first ultrasonic signal, and the one or more processors acquires an identification number of the user authentication device of the first user based on the second ultrasonic signal.

13. The system of claim 9, wherein the input/output device includes a touch screen, the one or more processors displays information request for the user authentication device of the first user by using the touch screen and acquires a selection of the user in response to the displayed information, and the one or more processors acquires an identification number for the user authentication device of the first user based on the acquired user selection data.

14. A server comprising:

a wireless communication circuit;

one or more processors electrically connected to the wireless communication circuit; and a memory electrically connected to the one or more processors, wherein the wireless communication circuit receives double-encrypted first data from a first electronic device, the one or more processors stores first result data to which a first decryption method that is predetermined for the first data is applied in the memory, the first result data includes identification information on the first electronic device, the wireless communication circuit receives second data from a second electronic device, the one or more processors retrieves second result data to which a second encryption method that is predetermined for the second data is applied in the memory, and the wireless communication circuit transmits identification information on the first electronic device according to the retrieving result to the second electronic device.

15. The server of claim 14, wherein the first result data includes encrypted user biometric information of the first electronic device, and does not include key data for decrypting the encrypted user biometric information of the first electronic device.

16. The server of claim 14, wherein the one or more processors transmits user authentication completion data to the second electronic device in response to the second result data being retrieved in the memory to the second electronic device.

17. The server of claim 14, wherein the one or more processors transmits the second data to the first electronic device in response to the second result data being retrieved in the memory.

18. The system of claim 1, wherein the user authentication request device is an electronic device installed in a store.

19. The system of claim 9, wherein the user authentication request device is an electronic device installed in a store.

* * * * *